Patented June 15, 1948

2,443,264

UNITED STATES PATENT OFFICE 2,443,264

COMPOUNDED LUBRICATING OIL

Louis A. Mikeska, Westfield, N. J., assignor to Standard Oil Development Company, a corporation of Delaware No Drawing. Original application February 19, 1944, Serial No. 523,091. Divided and this application March 8, 1946, Serial No. 653,152

7 Claims. (Cl. 252—46.6)

This invention relates to lubricants and other organic materials subject to deterioration in the presence of oxygen, and it relates more particularly to mineral lubricating oil compositions for use as crankcase lubricants for internal combustion engines and to addition agents suitable for retarding the deterioration of such oils and for improving other properties of the same. This application is a division of my copending application Serial No. 523,091, filed February 19, 1944 (now abandoned).

In accordance with the present invention a new class of organic compositions are described which are particularly useful as additives for mineral lubricating oils used in internal combustion engines, in which they act as inhibitors of oxidation and as agents for promoting engine cleanliness generally. In serving as inhibitors of oil deterioration they aid in the prevention of ring sticking, piston skirt varnish formation, deposition of sludge, and the like. They are particularly useful in inhibiting the normal corrosiveness of the oil when in contact with copper-lead, cadmium-silver and other similar bearings now widely used in automotive engines. These compounds are likewise suitable for use as antioxidants in organic materials generally where the organic material is known to be susceptible to deterioration in the presence of oxygen.

The new class of antioxidant compounds are organic compounds containing both phosphorus and sulfur and may be considered as polysulfide derivatives of organo-substituted thiophosphorous, thiophosphoric, thiophosphonic, thiophosphonous, thiophosphinic and thiophosphinous acids. They may be represented by the following general formula:

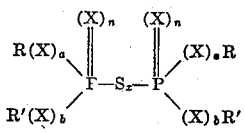

in which R and R' are the same or different aliphatic, aromatic or aliphatic-aromatic radicals, X is oxygen or sulfur and is joined to a carbon atom of the R or R' group, $a$, $b$, and $n$ are 0 or 1, and $x$ is an integer from 2 to 4.

Particularly preferred are the polysulfide derivatives of thiophosphoric and thiophosphorous acids. These are represented by the formula:

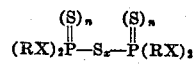

where R is an aliphatic, aromatic or aliphatic-aromatic radical, X is oxygen or sulfur, $n$ is 0 or 1, and $x$ is an integer from 2 to 4. The radical R is preferably a hydrocarbon group, which may be alkyl, aryl, alkaryl or aralkyl and may contain various substituent groups in place of one or more hydrogen atoms, and the oxygen or sulfur atom of the RX group is attached to a carbon atom of the R group. Among the various substituent atoms and groups which may be attached to the R groups may be mentioned alkyl, aryl, alkoxy, carboxyl, hydroxyl, sulfhydryl, nitro, amino, aldehydo, keto, ester, and halogen substituted hydrocarbon groups, as well as halogen atoms.

Typical compounds representative of the new class of additives are the following:

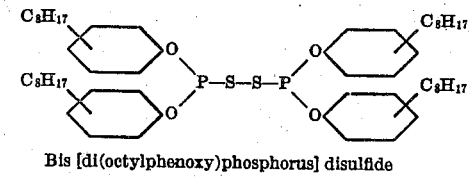

Bis [di(octylphenoxy)phosphorus] disulfide

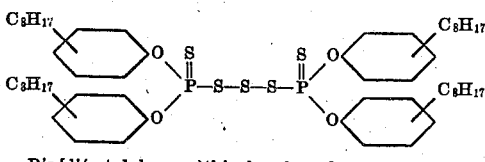

Bis [di(octylphenoxy)thiophosphorus] trisulfide

The new compositions may be readily prepared by first reacting an alcohol, phenol or aliphatic or aromatic mercaptan with a sulfide of phosphorus, such as $P_2S_3$, $P_2S_5(P_4S_{10})$, $P_4S_3$, $P_4S_7$ and the like, to form a partially esterified thiophosphorous or thiophosphoric acid, and then further reacting this product as such or in the form of a metal salt with an oxidizing agent or with a sulfur halide. Thus, when an alcohol is reacted with phosphorus trisulfide, a dialkylated monothiophosphorous acid is formed according to the following equation:

This alkylated thiophosphorous acid may then be treated with an oxidizing agent or with sulfur dichloride or sulfur monochloride to form a disulfide, trisulfide or tetrasulfide, respectively, according to the following equations:

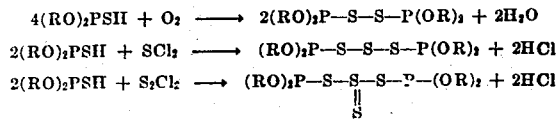

Similarly, when the alcohol is reacted with phosphorus pentasulfide, the corresponding di-substituted dithiophosphoric acid will be formed, and this may likewise be converted into disulfide, trisulfide or tetrasulfide compounds. Suitable alcohols which may be employed include octyl alcohol, cetyl alcohol, stearyl alcohol, methyl cyclohexanol, oleyl alcohol, wax alcohols, phenyl ethyl alcohol, phenyl octyl alcohol, and the like. Sulfurized alcohols such as sulfurized oleyl alcohol may also be used. Corresponding reactions will take place by starting with mercaptans, phenols or thiophenols instead of alcohols. Suitable oxidizing agents for converting the thiophosphorous and thiophosphoric acids to disulfides include iodine, potassium triiodide, ferric chloride, sodium hypochlorite, or oxygen itself, but it is not intended that the invention be limited in any manner by the oxidizing agent used.

Among the more preferred starting materials are the phenols and their alkylated derivatives, and the naphthols, as well as derivatives of these containing substituents such as halogen, nitro groups, amino groups, keto groups, carboxyl groups, ester groups, etc. Typical preferred phenolic materials are the cresols, xylenols, mesitol, butyl phenol, amyl phenol, diamyl phenol, tertiary octyl phenol, cetyl phenol, octadecyl phenol, cashew nut shell phenol (cardanol), phenyl phenol (hydroxybiphenyl), petroleum phenols, wax alkylated phenols and the like. Instead of the phenols themselves there may be employed phenol sulfides, such as those obtained by reacting phenols with sulfur halides. Among these phenol sulfides are included tertiary octyl phenol sulfide, di-tertiary amyl phenol sulfide, cetyl phenol sulfide and wax alkylated phenol sulfides.

Suitable products for use in the present invention may also be prepared from mixed organo-substituted thioacids of phosphorus, as, for example, those prepared by reaction of a sulfide of phosphorus with a mixture of a phenol and an alcohol, a phenol and a mercaptan, a phenol sulfide and an alcohol, a phenol and a phenol sulfide, an alcohol and a mercaptan, a cyclic alcohol and a straight chain alcohol, etc. Thus, for example, a mixture of tertiary octyl phenol sulfide and decanol may be treated with $P_2S_5$ and the resulting mixed thiophosphoric acid converted to the desired di-, tri-, or tetrasulfide.

In the following examples are given in detail methods by which several typical compounds illustrating the new class of additives may be prepared. Tests demonstrating the usefulness of these compounds as additives for lubricating oils are also described. It should be understood that these examples are given for illustrative purposes only and should not be considered as limiting the scope of the invention in any way.

EXAMPLE 1

*Bis-dioctoxyphosphorus tetrasulfide*

520 grams (4 mols) of octyl alcohol (2-ethylhexanol) was added to 158 grams (1 mol) of $P_2S_3$ in a flask equipped with a thermometer, stirrer and return condenser. The mixture was heated to about 80° C., at which temperature a vigorous evolution of $H_2S$ was noted. The temperature of the reaction mixture was maintained at 80–90° C. until no more $H_2S$ was given off (about 3 hours), while vigorous agitation was maintained. The mixture was then cooled, diluted with ether and filtered to remove a small amount of insoluble material. The acid product was neutralized with an alcoholic solution of NaOH and the solvent was removed under reduced pressure. The residue consisted of a soft light colored soap.

70 grams (½ mol) of the sodium salt formed as described above was dissolved in 100 cc. of benzene, and 15.3 grams (½ mol) of $S_2Cl_2$ in 50 cc. of benzene was added. After stirring for about ½ hour the reaction mixture was washed several times with water, dried and the benzene stripped off under atmospheric pressure, leaving 71 grams of a clear straw colored oil.

EXAMPLE 2

*Bis[di(tert.-octylphenoxy)thiophosphorus] trisulfide*

A reaction flask equipped with a stirrer and return condenser was charged with 412 grams (2 mols) of tert.-octyl phenol. To this was then added 750 cc. dioxane and 111 grams (½ mol) $P_2S_5$. The mixture was refluxed for 3 hours and then transferred to a distilling flask and the solvent was removed at 100° C. and 2 mm. pressure, yielding a light colored viscous oil. This oil was transferred to another reaction flask equipped with stirrer, return condenser and dropping funnel, to which was added 500 cc. of benzol. The dropping funnel was charged with 48 grams (about ½ mol) of sulfur dichloride. The latter was then added slowly to the reactor with rapid stirring. Some heat was evolved during the addition of the $SCl_2$. When all of this had been added, the heating was continued until no more HCl was given off, nitrogen being passed through in order to sweep out the HCl. The reaction mixture was transferred to a distilling flask and the solvent removed at 100° C. and under 3 mm. pressure yielding a light yellow oil containing 12.88% sulfur and 5.80% phosphorus.

EXAMPLE 3

*Bis[di(methylcyclohexoxy)thiophosphorus] trisulfide*

A flask equipped with a stirrer and a return condenser was charged with 255 grams of p-methylcyclohexanol and 500 cc. of dioxane. To this was then added 127 grams of $P_2S_5$. The mixture was refluxed until no more $H_2S$ was given off (all the $P_2S_5$ dissolving in less than one hour), which required continued heating for a total of 2½ hours. The reaction mixture was transferred to a distilling flask and the solvent was removed at 100° C. and 3 mm. pressure. The residue weighed 346 grams.

340 grams of this product and 500 cc. of benzol were placed in another reaction flask, and a mixture of 60 grams of $SCl_2$ and 60 cc. of benzene was added slowly with rapid stirring. A fair amount of heat was evolved during this step. When all the $SCl_2$ had been added, the mixture was refluxed until no more HCl gas was given off, removal of the latter being aided by passing nitrogen through the mixture. When the evolution of hydrogen chloride had ceased (after about 4 hours), the mixture was transferred to a distilling flask and the solvent was removed at 100° C. and 3 mm. pressure. The residue weighed 335 grams.

EXAMPLE 4

*Bis-dicresylthiophosphorus disulfide*

A mixture of 216 grams (2 mols) of meta cresol, 500 cc. of toluene, 120 grams of pyridine and 111 grams (½ mol) of phosphorus pentasulfide was heated at 100° C. under reflux with rapid stirring for 3 hours. The reaction mixture, which now consisted of two layers, was filtered to remove a small amount of unchanged $P_2S_5$. The filtrate was poured into a dilute sodium carbonate solution. The toluene layer was separated from the aqueous layer and the latter was extracted with ether to remove the last traces of unchanged cresol and then acidified with a little dilute hydrochloric acid. The resulting crude pyridine salt of di-cresyldithiophosphoric acid was extracted with ethylene dichloride and the extract was washed with water and finally dried over sodium sulfate. On removal of the solvent, the residue, consisting of the purified pyridine salt of di-m-cresyldithiophosphoric acid, was obtained as a viscous reddish oil which crystallized on standing.

50 grams of this pyridine salt was suspended in water and neutralized with sodium hydroxide. The solution was treated with aqueous potassium triiodide solution until no more iodine was absorbed. The product was extracted with ether, and the extract was washed several times with dilute hydrochloric acid to remove the pyridine. Finally the ether extract was washed once with dilute sodium hydroxide, whereupon it was dried over sodium sulfate. On removal of the ether, 48 grams of the desired disulfide was obtained as a light colored oil.

EXAMPLE 5

The Underwood oxidation test was applied to a base oil consisting of a solvent extracted paraffinic oil of 47.5 seconds viscosity (Saybolt) at 210° F. and a viscosity index of 113 and to a blend consisting of the same base oil to which had been added 1% of the product of Example 2, also to a blend consisting of the base oil to which has been added 1% of the product of Example 3. The test was conducted as follows:

The polished bearings of the Underwood machine were thoroughly abraded with emery cloth to expose a fresh surface so that corrosion would proceed uniformly, and then accurately weighed. The apparatus was filled with 1,500 cc. of the lubricant under test and the pump and heater started. The oil pressure was regulated to 10 lbs./sq. in. by means of by-pass valves and maintained at this pressure throughout the test. As soon as the oil had attained the test temperature of 325° F. the heater and pump were turned off just long enough to put the already prepared and weighed bearings in place. Two copper-lead bearing halves were used simultaneously in the test. These were attached to a highly polished copper baffle approximately 2" x 10" whose function was to accelerate deterioration of the lubricating oil during the test. At the end of the test period of 5 hours the bearings were removed, cleaned with naphtha, dried and weighed. A new copper-lead bearing was then placed in the machine and the test conducted for an additional 5 hour period. To accelerate corrosion iron naphthenate in an equivalent of 0.01% $Fe_2O_3$ was added to each oil sample. Table I gives the cumulative bearing weight losses at the end of the 5 hour and 10 hour periods and clearly shows that the products of the present invention are very effective corrosion inhibitors.

Table I

| Oil | Cumulative bearing weight loss, mg. | |
| --- | --- | --- |
| | 5 hrs. | 10 hrs. |
| Base Oil | 155 | 390 |
| Base Oil+1% Product of Example 2 | 4 | 5 |
| Base Oil+1% Product of Example 3 | 9 | 13 |

EXAMPLE 6

In the following tests a simple of an unblended base oil consisting of a solvent extracted Coastal naphthenic oil of 60 seconds Saybolt viscosity (210° F.) and a sample of the base oil containing 1% of the product of Example 2 were tested in a six cylinder Chevrolet engine run under high speed, high temperature conditions, namely, 30 B. H. P. output, 3150 R. P. M., 280° F. oil temperature, 200° F. jacket temperature and an air/fuel ratio of 14.2/1 for periods of 36 hours. After each test was completed the engine parts were examined and given demerit ratings based on their condition. The individual demerits were weighted and an overall demerit rating calculated from them. A lower demerit rating indicates a better engine condition and hence a better performance of the oil in the engine. The results are shown in Table II. It will be readily seen that the blended oil gave a much cleaner engine than did the base oil itself.

Table II

| Oil | Engine Demerits | | | | Bearing Wt. Loss (mg. per bearing) |
| --- | --- | --- | --- | --- | --- |
| | Overall | Ring Zone | Piston Skirts | Sludge | |
| Base Oil | 3.37 | 2.61 | 10.00 | 4.63 | 404 |
| Base Oil+1 %Product of Example 2 | 0.84 | 0.86 | 2.67 | 0.34 | 47 |

The products of the present invention may be employed not only in ordinary hydrocarbon lubricating oils but also in the "heavy duty" type of lubricating oils which have been compounded with such detergent type additives as metal soaps, metal petroleum sulfonates, metal phenates, metal alcoholates, metal alkyl phenol sulfides, metal organo phosphates, thiophosphates, phosphites and thiophosphites, metal salicylates, metal xanthates and thioxanthates, metal thiocaramates, reaction products of metal phenates and sulfur, reaction products of metal phenates and phosphorus sulfides, metal phenol sulfonates, and the like. Thus, the polysulfide derivatives of the organo-substituted thio acids of phosphorus may be used in lubricating oils containing such addition agents as barium tert.-octyl phenol sulfide, calcium tert.-amyl phenol sulfide, nickel oleate, barium octadecylate, calcium phenyl stearate, zinc diisopropyl salicylate, aluminum naphthenate, calcium cetyl phosphate, barium di-tert.-amyl phenol sulfide, calcium petroleum sulfonate, zinc methyl cyclohexyl thiophosphate, calcium dichlorostearate, etc.

The following are examples of representative lubricating oil compositions in which the additives of the present invention are employed in conjunction with detergent additives:

(1) Refined Mid-Continent lubricating oil plus
    1.2% calcium sulfonate
    0.8% bis [di(tert.-octylphenoxy)thiophosphorus] trisulfide
(2) Solvent extracted Coastal naphthenic oil plus
    1% barium tert.-octyl phenol sulfide
    1% sodium-calcium sulfonates
    1% bis [di(methylcyclohexoxy)phosphorus] disulfide
(3) Paraffinic lubricating oil plus
    1.2% barium diamyl phenol sulfide
    0.6% bis [di(tert.-amylphenoxy)thiophosphorus] trisulfide The lubricating oil base stocks used in the compositions of this invention may be straight mineral lubricating oils or distillates derived from paraffinic, naphthenic, asphaltic or mixed base crudes, or, if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced, for example, by solvent extraction with solvents of the type of phenol, sulfur dioxide, furfural, dichloro ethyl ether, nitrobenzene, crotonaldehyde, etc. Hydrogenated oils or white oils may be employed as well as synthetic oils prepared, for example, by the polymerization of olefins or by the reaction of oxides of carbon with hydrogen or by the hydrogenation of coal or its products. In certain instances cracking coil tar fractions and coal tar or shale oil distillates may also be used. Also, for special applications, animal, vegetable or fish oils or their hydrogenated or voltolized products may be employed, either alone or in admixture with mineral oils.

For the best results the base stock chosen should normally be that oil which without the new additives present gives the optimum performance in the service contemplated. However, since one advantage of the additives is that their use also makes feasible the employment of less satisfactory mineral oils or other oils, no strict rule can be laid down for the choice of the base stock. Certain essentials must of course be observed. The oil must possess the viscosity and volatility characteristics known to be required for the service contemplated. The oil must be a satisfactory solvent for the additive, although in some cases auxiliary solvent agents may be used. The lubricating oils, however they may have been produced, may vary considerably in viscosity and other properties depending upon the particular use for which they are desired, but they usually range from about 40 to 150 seconds Saybolt viscosity at 210° F. For the lubricating of certain low and medium speed Diesel engines the general practice has often been to use a lubricating oil base stock prepared from naphthenic or aromatic crudes and having a Saybolt viscosity at 210° F. of 45 to 90 seconds and a viscosity index of 0 to 50. However, in certain types of Diesel service, particularly with high speed Diesel engines, and in aviation engine and other gasoline engine service, oils of higher viscosity index are often preferred, for example, up to 70 to 100, or even higher, viscosity index.

In addition to the materials to be added according to the present invention, other agents may also be used such as dyes, pour depressors, heat thickened fatty oils, sulfurized fatty oils, organo metallic compounds, metallic or other soaps, sludge dispersers, antioxidants, thickeners, viscosity index improvers, oiliness agents, resins, rubber, olefin polymers, voltolized fats, voltolized mineral oils, and/or voltolized waxes and colloidal solids such as graphite or zinc oxide, etc. Solvents and assisting agents, such as esters, ketones, alcohols, aldehydes, halogenated or nitrated compounds, and the like may also be employed.

Assisting agents which are particularly desirable are the higher alcohols having eight or more carbon atoms and preferably 12 to 20 carbon atoms. The alcohols may be saturated straight and branched chain aliphatic alcohols such as octyl alcohol ($C_8H_{17}OH$), lauryl alcohol ($C_{12}H_{25}OH$)

cetyl alcohol ($C_{16}H_{33}OH$), stearyl alcohol, sometimes referred to as octadecyl alcohol ($C_{18}H_{37}OH$), heptadecyl alcohol ($C_{17}H_{35}OH$), and the like; the corresponding olefinic alcohols such as oleyl alcohol; cyclic alcohols, such as naphthenic alcohols; and aryl substituted alkyl alcohols, for instance, phenyl octyl alcohol, or octadecyl benzyl alcohol or mixtures of these various alcohols, which may be pure or substantially pure synthetic alcohols. One may also use mixed naturally occurring alcohols such as those found in wool fat (which is known to contain a substantial percentage of alcohols having about 16 to 18 carbon atoms) and in sperm oil (which contains a high percentage of cetyl alcohol); and although it is preferable to isolate the alcohols from those materials, for some purposes, the wool fat, sperm oil or other natural products rich in alcohols may be used per se. Products prepared synthetically by chemical processes may also be used such as alcohols prepared by the oxidation of petroleum hydrocarbons, e. g., paraffin wax, petrolatum, etc.

These assisting agents serve to enhance the detergent and sludge dispersive qualities and aid the solubility of the metal-containing additive and at the same time impart some oiliness properties to the lubricating oil compositions.

In addition to being employed in crankcase lubricants the additives of the present invention may also be used in extreme pressure lubricants, engine flushing oils, industrial oils, general machinery oils, process oils, rust preventive compositions and greases. Also their use in motor fuels, Diesel fuels and kerosene is contemplated. A particular application in this regard is their use in motor fuels containing tetraethyl lead or other anti-knock agents, the additives of the present invention serving not only as antioxidants for the fuel but also as stabilizers for the anti-knock agent itself. Since these additives exhibit antioxidant properties and are believed also to possess ability to modify surface activity, they may be employed in asphalts, road oils, waxes, fatty oils of animal or vegetable origin, soaps, and plastics. Similarly, they may be used in natural and synthetic rubber compounding both as vulcanization assistants and as antioxidants, and generally they may be used in any organic materials subject to deterioration by atmospheric oxygen.

The present invention is not to be considered as limited by any of the examples described herein which are given by way of illustration only, but is to be limited solely by the terms of the appended claims.

I claim:
1. A mineral lubricating oil containing a small quantity sufficient to stabilize said oil in the pres- ence of oxygen but not greater than about 1% of a compound of the formula

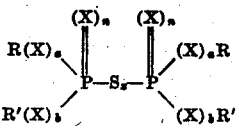

where R and R' are organic groups selected from the class consisting of aliphatic, aromatic and aliphatic-aromatic groups, X is a member of the group consisting of oxygen and sulfur and is joined to a carbon atom of group R or R', $a$, $b$ and $n$ are each 0 or 1, and $x$ is an integer from 2 to 4.

2. A mineral lubricating oil containing a small quantity sufficient to stabilize said oil in the presence of oxygen but not greater than about 1% of a compound of the formula

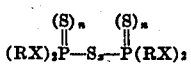

where R is an organic group selected from the class consisting of aliphatic, aromatic and aliphatic-aromatic groups, X is a member of the group consisting of oxygen and sulfur and is joined to a carbon atom of group R, $n$ is 0 or 1, and $x$ is an integer from 2 to 4.

3. A mineral lubricating oil according to claim 2 in which R of the formula is a hydrocarbon group and X is oxygen.

4. A mineral lubricating oil according to claim 2 in which R of the formula is a hydrocarbon group, X is oxygen and $x$ is 3.

5. A mineral lubricating oil containing a small quantity sufficient to stabilize said oil in the presence of oxygen but not greater than about 1% of bis [di(octylphenoxy)thiophosphorus] trisulfide.

6. A mineral lubricating oil containing a small quantity sufficient to stabilize said oil in the presence of oxygen but not greater than about 1% of bis [di(methylcyclohexoxy)thiophosphorus] trisulfide.

7. A mineral lubricating oil according to claim 2 in which R of the formula is an alkyl group, X is oxygen, $n$ is 1, and $x$ is an integer from 2 to 4.

LOUIS A. MIKESKA.

REFERENCES CITED

The following references are of record in the file of this patent:

UNITED STATES PATENTS

| Number | Name | Date |
|---|---|---|
| 2,343,831 | Osborne | Mar. 7, 1944 |